(12) United States Patent
Waring

(10) Patent No.: US 11,744,232 B2
(45) Date of Patent: Sep. 5, 2023

(54) BEEHIVE

(71) Applicant: Mark Waring, Swansea, MA (US)

(72) Inventor: Mark Waring, Swansea, MA (US)

(*) Notice: Subject to any disclaimer, the term of this patent is extended or adjusted under 35 U.S.C. 154(b) by 52 days.

(21) Appl. No.: 17/180,069

(22) Filed: Feb. 19, 2021

(65) Prior Publication Data
US 2021/0259216 A1 Aug. 26, 2021

Related U.S. Application Data

(60) Provisional application No. 62/978,519, filed on Feb. 19, 2020.

(51) Int. Cl.
*A01K 47/00* (2006.01)
*A01K 47/02* (2006.01)
*A01K 47/06* (2006.01)

(52) U.S. Cl.
CPC ............. *A01K 47/02* (2013.01); *A01K 47/06* (2013.01)

(58) Field of Classification Search
CPC ......... A01K 47/00; A01K 47/02; A01K 47/06
USPC ................................................. 449/3, 13, 26
See application file for complete search history.

(56) References Cited

U.S. PATENT DOCUMENTS

| | | | | |
|---|---|---|---|---|
| 80,587 A * | 8/1868 | Bassett | .................. | A01K 47/00 449/26 |
| 111,107 A * | 1/1871 | Claypool | ............... | A01K 47/00 449/40 |
| 122,990 A * | 1/1872 | Bucklin | ................. | A01K 47/00 449/26 |
| 131,610 A * | 9/1872 | Grabbe | .................. | A01K 47/00 449/32 |
| 131,613 A * | 9/1872 | Hixson | .................. | A01K 47/06 449/20 |
| 180,027 A * | 7/1876 | J. E. et al. | ............. | A01K 47/00 449/41 |
| 283,554 A * | 8/1883 | Bailey | .................... | A01K 47/00 449/34 |
| 470,111 A * | 3/1892 | Drummond | ............ | A01K 47/00 449/32 |
| 680,025 A * | 8/1901 | Decroly | ................. | A01K 47/00 449/26 |
| 736,226 A * | 8/1903 | Danzenbaker | ......... | A01K 47/00 449/16 |
| 804,736 A * | 11/1905 | Kregel | .................... | A01K 47/02 449/37 |
| 1,004,335 A * | 9/1911 | Aspinwall | .............. | A01K 47/00 449/16 |
| 1,036,950 A * | 8/1912 | Anthony | ................ | A01K 47/00 449/32 |

(Continued)

FOREIGN PATENT DOCUMENTS

| | | | | |
|---|---|---|---|---|
| AU | 2003200557 A1 | 9/2003 | | |
| CN | 107135984 A * | 9/2017 | | |
| FR | 2584569 A1 * | 1/1987 | ............ | A01K 47/00 |

*Primary Examiner* — Joshua J Michener
*Assistant Examiner* — Henry Hooper Mudd
(74) *Attorney, Agent, or Firm* — Carolyn S. Elmore; Elmore Patent Law Group, P.C.

(57) ABSTRACT

A beehive providing improved humidity and moisture control within the hive box through incorporation of a condensation chamber, improved temperature stability through enhanced airflow, enhanced colony health through improved control of temperature and humidity, and reduction of physical damage to bees during routine maintenance and harvesting tasks through novel construction geometry.

20 Claims, 5 Drawing Sheets

(56) References Cited

U.S. PATENT DOCUMENTS

| | | | | |
|---|---|---|---|---|
| 1,593,008 | A | * | 7/1926 | Baumgartner ......... A01K 47/06 449/25 |
| 2,292,110 | A | * | 8/1942 | Evans .................... A01K 47/00 449/14 |
| 2,580,282 | A | | 12/1951 | Colley |
| 3,438,070 | A | * | 4/1969 | Florance ................ A01K 47/06 449/2 |
| 4,443,904 | A | * | 4/1984 | van Muyden .......... A01K 47/00 449/6 |
| 2008/0064298 | A1 | * | 3/2008 | Junqueira de Souza .................... A01K 51/00 449/2 |
| 2011/0263182 | A1 | * | 10/2011 | Custer .................... A01K 47/06 449/15 |
| 2011/0312244 | A1 | | 12/2011 | Vincent |
| 2012/0302132 | A1 | * | 11/2012 | Koenen .................. A01K 47/06 449/17 |
| 2013/0273807 | A1 | * | 10/2013 | Petro ...................... A01K 53/00 449/11 |
| 2014/0378027 | A1 | * | 12/2014 | Jackson ................. A01K 47/00 449/9 |
| 2016/0044898 | A1 | * | 2/2016 | Liddle .................... A01K 47/06 449/15 |
| 2016/0353714 | A1 | * | 12/2016 | Manzer .................. A01K 47/06 |
| 2018/0035651 | A1 | | 2/2018 | Anderson |
| 2019/0069525 | A1 | * | 3/2019 | Bell ........................ A01K 47/02 |
| 2020/0253168 | A1 | * | 8/2020 | Pearson ................. A01K 47/06 |

* cited by examiner

BEEHIVE

RELATED APPLICATION

This application claims the benefit of U.S. Provisional Application No. 62/978,519, filed on Feb. 19, 2020. The entire teachings of the above application are incorporated herein by reference.

BACKGROUND OF THE INVENTION

Domestic beekeeping has been practiced world-wide for centuries with the primary purposes being production of honey and wax, and pollination of crops. Most recently, more focus has shifted to pollination due to statistically significant increases in beehive mortality. Experts have attributed these increases to the introduction of parasites and diseases into the bee colonies.

Common commercially available domestic beehives are known in the art as Langstroth, Warre, Kenya, and Cathedral hives. Each design has its own unique attributes and drawbacks.

The Langstroth design, which has been around since the 1850s and is the most common design used in commercial honey production, consists of rectangular boxes of varying heights which can be stacked on top of each other in order to expand usable space for the colony. Typically, the brood box, which houses the bee colony, will be both the lowest and tallest box in the stack. Additional boxes containing comb frames are added to the top of the stack as honey production increases. The comb frames are fully framed, hung parallel to each other, and run lengthwise within the box, with regard to the long side of the rectangle. In winter climates, hive maintenance may include wrapping or insulating the boxes, or moving the hive to a sheltered location.

The Wane design is similar to the Langstroth in box design and construction. However, in the Wane, new boxes are added to the hive at the bottom rather than on top. Also, the comb frames use only a top bar rather than a full frame, for comb support.

Another top bar design, also known as a Kenya Hive, is unique in that the comb frames which are top bar only, are hung parallel with each other, but run crosswise with regard to the long side of the rectangle. As compared to the Langstroth and Warre designs, the Kenya hive grows horizontally rather than vertically as additional comb frames are added.

Drawbacks of horizontal box designs such as those of Langstroth and Wane include low air flow or dead air in the corners of the boxes. Mitigation requires ventilation holes which can have a negative impact on the bees' ability to regulate the brood's temperature. Also, moisture produced from the colony rises and collects at the roof, condenses, and then rains back down on the colony. The bees will instinctively try to seal the frames with propolis, a resin-like substance they manufacture. However, creation of the propolis requires excess expenditure of energy and hive resources. The propolis also makes separation of the frames more difficult for the beekeeper, which in turn, places more stress on the colony. Past moisture control solutions have been employed, such as placement of moisture collection pads, newspaper, and even tilting the hive on an angle to facilitate runoff away from the hive. Failure to control the moisture ultimately results in mold, mildew, and continuous damp, which compromises the colony's health and resilience.

Other drawbacks of the Langstroth design include box weight, and the square frame designs. When the base box or brood box frames are filled, additional boxes or "supers" are added to the top of the stack as needed for expansion. The additional boxes can weigh as much as 90 lbs each. When inspecting the health of the brood box, every super must be removed. Also, the long straight frames and 90-degree angles of the design don't provide a natural starting point from which the bees can begin building. Wax or plastic foundations and barriers have been added to the frames to address this issue, however, these solutions tend to just further restrict airflow and create additional health risks for the colony. Because bees must continually move over the internal nest to get around the barriers, cross contamination in the form of mites, other invasive species and even environmental pesticides infusing in the foundation wax can poison the nest. Removal of the frame from the brood box has its own drawbacks. In addition to having to deal with the excess propolis as previously mentioned, removal of the frames leads to "rolling" of the bees. As a frame is removed, any bees still on the structure of the frame will be scraped off by the other static frames and structures, damaging or killing the bees, which naturally causes defensive actions from the other bees. Swarming and aggressiveness causes additional stress on the hive. There is also always a risk that the queen will be killed during frame removal.

Top bar hive designs such as that of Warre, are the simplest and least expensive. These designs use an angled or straight sided box with straight bars at the top of the box. The straight bars enable the bees to attach combs to the bars. This allows beekeepers to lift the bars for inspection and harvest of honey. A major drawback of this design lies in the fact that the combs are prone to breaking off from the inadequate single attachment point during extraction from the hive. The bees will instinctively counter the lack of support by forming a wax extension or brace of the comb in order to support the weight. This requires the beekeeper to detach or cut the brace from each honeycomb they remove. Cross combing construction is also a problem with this design. When the bars are not properly aligned, the bees will attach the honeycomb to several bars at once. This lends itself to formation of irregularly shaped combs to support ventilation requirements. It also makes the beekeepers management and harvesting of the combs more difficult. Often, it will lead to loss of the entire comb if not caught in early stages of formation.

A Cathedral hive is a horizontal hexagon, multi-ventilation design. It features multiple frames for colony expansion. This hive design attempted to address the weak single point attachment of the comb, the issues associated with cross combing found in the top bar designs, and improved air flow. The design also provided modest improvements in moisture and brood temperature control issues. The comb frames are three-sided half hexagons, which provide additional comb support and reduce the crossover contamination issues previously described. There are numerous passages for the bees throughout the comb frames which reduces the likelihood of forager bees encountering house bees. The separation occurs as the house bees reside mostly on the floor of the horizontal box design hive. The moisture and temperature regulation have been rectified with a series of holes and ventilation paths throughout the hives. These holes, slots, lateral vents and a vent drawer serve for passage of both bees and airflow throughout the hive. However, the complexity of the design, its construction, and management of the passage and ventilation system requires the beekeeper to stay on top of all adjustments in order to maintain control of moisture and brood temperature issues. As such, the cost and complication of the system requires extensive knowledge and additional time and labor of the beekeeper.

None of the previously described designs have fully addressed the issue of rain, snow and other forms of precipitation from sitting on top of the hives. Furthermore, all of the other hive designs require additional external supports to enable brood inspection and harvest of the honeycomb. The additional footprint creates more contact with the ground, which gives rise to more opportunity for infestation by ants and other insects within the hive and colony.

SUMMARY OF THE INVENTION

The current invention provides an improved beehive design that addresses the shortcoming of previous designs while facilitating the ability of bees to follow their natural instincts. It features a natural moisture control system, facilitated by roof placement and framing configuration, and a self-contained frame hanging system for inspection of the broods' nest and harvesting of the honeycomb that minimizes physical damage to bees and the stress placed on the colony by those activities. The moisture control system includes a condensation chamber that is remote with respect to the honeycomb. The beehive is maintained at an angle between vertical and horizontal (the "hive body angle"), relative to level ground such that air, rendered humid by the bees within the beehive, rises to the top of the beehive and is vented to a separate and distinct condensation chamber that can be adjacent to the hive box that houses the comb frames and, thereby, the honeycomb. The condensation chamber receives the humid air, which is then cooled by ambient conditions exterior to the beehive, condenses water within the humid air and drains to the water to the beehive exterior, for example, by passages in the base of the condensation chamber.

The unique hive body angle serves several functions. For example, in conjunction with the comb frames stacked along two ladders running the length of the hive box, the hive body angle allows for a longer more stable honeycomb compared to the Top Bar designs of similar dimensions. The instant design gives a higher yield of honey per frame than horizontal beehives due to the extended comb depth provided. It also does not require supers as found in Langstroth designs. The need to disassemble the stack of boxes for inspection and harvesting is eliminated. The hive body angle and polygonal body design eliminate dead air or low stagnate air circulation within the hive. Because natural passages around the outside of the combs are provided, the crossover between forager bees, the combs, and worker bees is drastically reduced. This serves to minimize contamination from mites, pathogens, and other invasive species which plague traditional box designs.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Following are detailed description of preferred embodiments, which are meant to be descriptive and not limiting.

The invention is an improved beehive.

Figure 1:
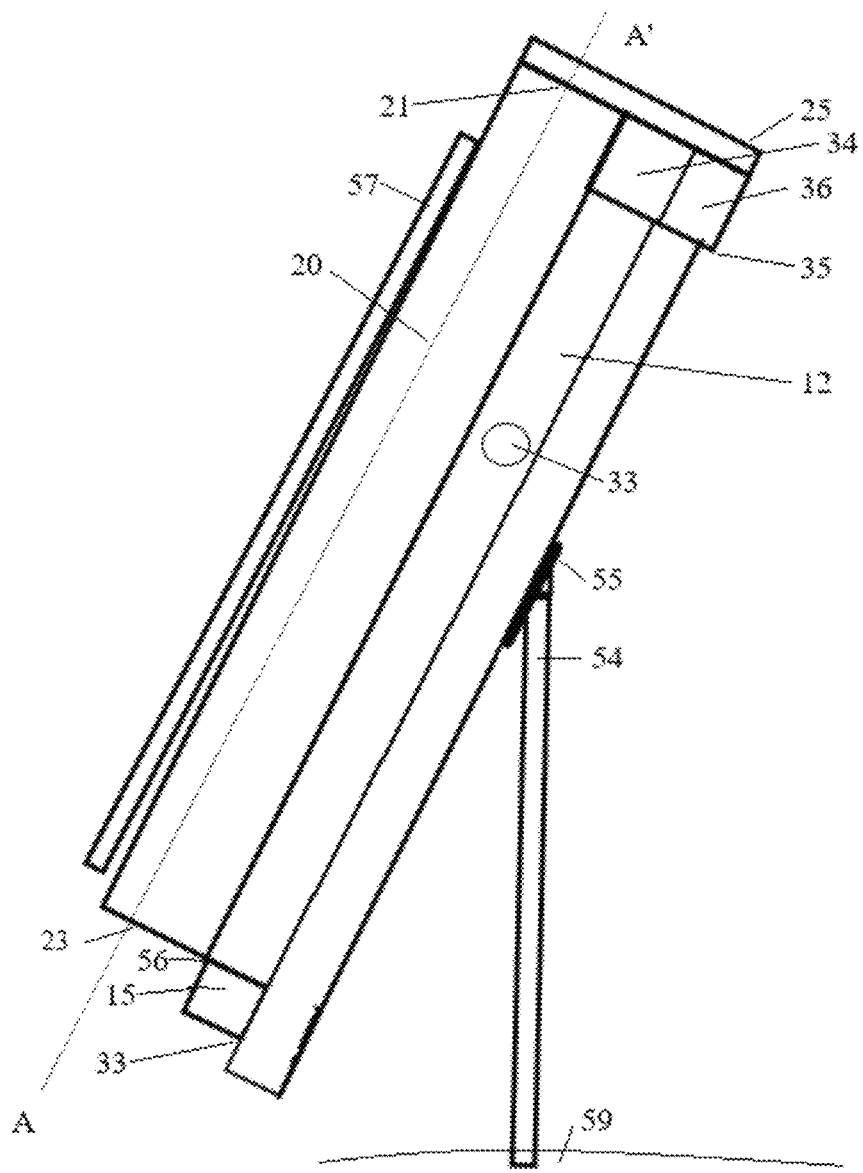
FIG. 1 is a side view of a closed beehive.

As shown in FIG. 1, the invention includes a beehive 10 comprising a hive box 12, a hive cover 20, a support post 54 (which can be typically attached to the hive box with an angled support 55) which can be disposed in the ground 59 at an angle. One or more bee entries 33 are located in the hive box. The hive cover 20 can include a first high cover end, or upper end, 21, a second high cover end, or lower end, 23, and, optionally, a roof plate 25 and/or a cover support leg 57. The hive box 12, includes a second hive box end, or lower end 15. Typically, the hive cover 20 will be attached to the hive box lower end 15 with a hive cover hinge 56. Preferably, as the hive cover 20 opens to expose the interior of the hive box 12, the cover support leg 57 will swing out and meet the ground 59. At the upper end of the hive box is a condensation chamber 34 which includes a drain outlet 35. This can be easily accomplished by installing a shroud 36.

Figure 2:
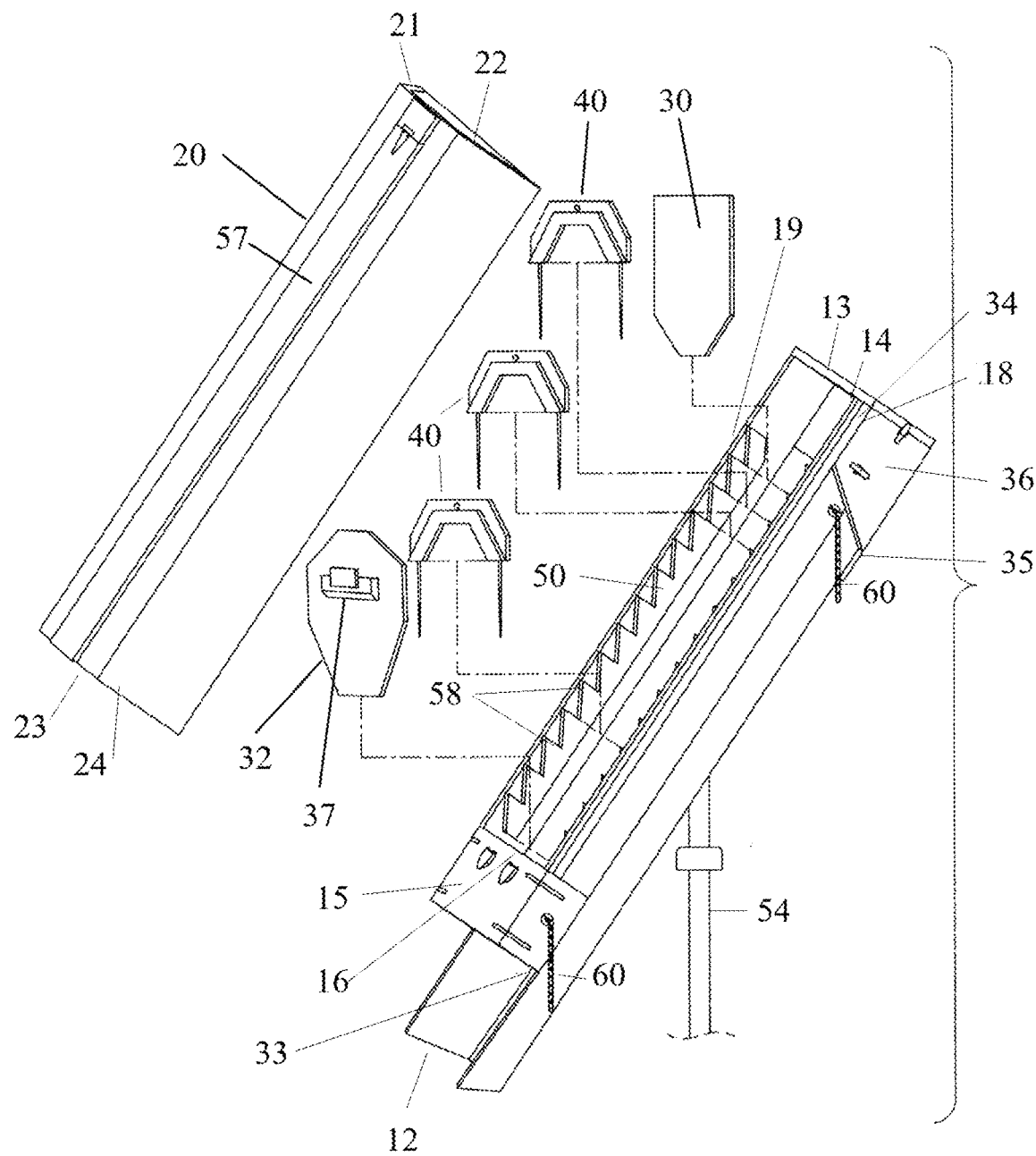
FIG. 2 is an exploded view of the cross section of a beehive.

As shown in FIG. 2, the invention includes a beehive 10 comprising: a first hive box end 13, a first hive box end face 14, a second hive box end 15, a second hive box end face 16, an upper comb stop 30, a lower comb stop 32, and a hive box 12. These components define the bottom volume of the beehive that house comb frames 40 and, thereby, honeycomb and bees. The first hive box end 13 is defined herein to be the upper end of the hive box, while the second hive box end 15 is defined herein to be the lower end. Upper and lower ends are to be understood literally as the upper end will be a higher elevation relative to the lower end and level ground upon installation.

The comb stops can be equipped with an adjustment shelf 37 to allow the comb stop to rest within the hive box at variable elevations. An adjustment shelf on the lower comb stop 32 can control or adjust the size of the bee entry 33 defined by the bottom of the comb stop and the floor of the hive box. An adjustment shelf on the upper comb stop 30 can control or adjust the size of the opening for air flow and ventilation.

The first and second hive box end faces 14, 16 are defined herein to be the interior faces of the hive box ends. Of course, the hive box ends will also be characterized by exterior faces and top and bottom faces, as is understood in a three dimensional structure. Likewise, the first hive cover end face 22 and second hive cover end face 24, are defined herein to be the interior faces of the hive cover ends. The hive cover ends will also be characterized by exterior faces and top and bottom faces, as is to understood in a three dimensional structure.

The beehive also has a hive cover 20. The hive cover 20 can be a simple roof to give access to the beehive box. Preferably, the hive cover 20 removably engages with the hive box 12. The hive box 12 and hive cover 20, when coupled or engaged, form an internal volume. The cross-section of the internal volume, perpendicular to the axis running longitudinally (shown as A-A' in FIG. 1) through the hive box is preferably polygonal in shape. The polygon can have 4 or more sides, such as 5, 6, 7, 8, 9, 10 or more. Preferred polygons are characterized by at least one obtuse angle, preferably 2, 3, 4, 5, 6, 7, or more, especially as defined by the hive cover, as the configuration provides better air flow within the beehive, thereby directing humid air to the condensation chamber. Of course, the polygon can also include one or more surfaces that incorporate an arc. An octagonal beehive is illustrated in the figures. The polygon can be symmetrical, such as when all sides are equal in length. However, that is not necessary. For example, the length defining the top-most plane of the hive cover, or roof plate, can be longer than the angled planes meeting the vertical sides of the beehive. Lengthening the vertical sides of the beehive can provide for increase internal volume for honeycomb growth as well.

The cross-section of the internal volume along the longitudinal axis is typically rectangular, however, other configurations are possible as well. In the rectangular configuration, it will be understood that the hive cover will meet the hive box on all 4 sides of the rectangle to provide a seal. It can be desirable to provide a windbreak 19, by adding a lip or offset on the inside or outside of the beehive to control cross airflow through the honeycomb. For example, the hive box can further comprise one or more hive cover supports 18 on the external surface of the hive box. The cover supports can be affixed to the hive box slightly below the top surface of the hive box. The top of the hive box then slides up into the hive cover slightly to provide the windbreak. In one embodiment of the invention, the supports are affixed to the hive box such that the windbreak is triangular in shape. The hive cover can meet the hive box squarely on all sides of the hive box or it can meet with an overhang to further facilitate rain drainage.

Additionally, it can be desirable to place one or two tension rods 60 to help adjust the hive box with the expansion of materials due to weight, humidity, ambient temperature and the like.

The upper end, or the end with the highest elevation of the hive cover can be covered with a roof plate 25, preferably composed of water-resistant material, such as metal or plastic. A roof plate 25 can help keep rain and the like, out of the beehive.

The hive cover can be equipped with a cover support leg 57. For example, the support leg can be hinged to the cover such that when the cover is opened or disengaged from the hive box, the support leg 57 extends vertically from the cover, meeting the ground or a surface to support the weight of the cover.

Again, the hive cover and hive box are removable engaged. This can be easily accomplished by coupling the box and cover with one or more hinges 56. In the beehive illustrated in the figures, a hinge is located at the lower end of the beehive and couples the second cover end to the second box end. However, the hinge can be located elsewhere, such as along one side of beehive or at the upper end. Indeed, hinges are optional and the hive cover can be completely removable and lifted away from the hive box as well. It is generally desirable to use one or more clasps to secure the hive cover to the hive box. In addition, individual pieces of the hive cover and hive box, such as one or more ends, can be removable as well to facilitate access to various sections or surfaces of the interior of the beehive. Clasps, latches, buckles or hooks can removably secure pieces in place without the need to use tools.

At the lower end, or the end with the lowest elevation of the hive box, a bee entry 33 can be located. In addition, it can be desirable to place a bee entry 33 in one or both sides of the hive box.

Inside the beehive, a plurality of comb frames 40 can be removably disposed within the hive box 12. At the lower end of the beehive, a lower comb stop 32 defines the bottom of the volume designed to contain the comb frames and the honeycomb. At the upper end of the beehive, an upper comb stop 30 defines the top of the volume designed to contain the comb frames and the honeycomb. The upper and lower comb stops can optionally be removable and/or adjustable such that the volume within the hive box available to the bees to make the honeycomb can be controlled. The lower comb stop can conveniently be configured to allow for a bee entry 33, which can also be adjustable to allow more or fewer bees egress into the beehive. For example, the bee entry 33 can be defined by the assembly of the lower comb stop and the hive box. The bee entry 33 can be adjusted by raising the lower comb stop, relative to the hive box.

Figure 4:
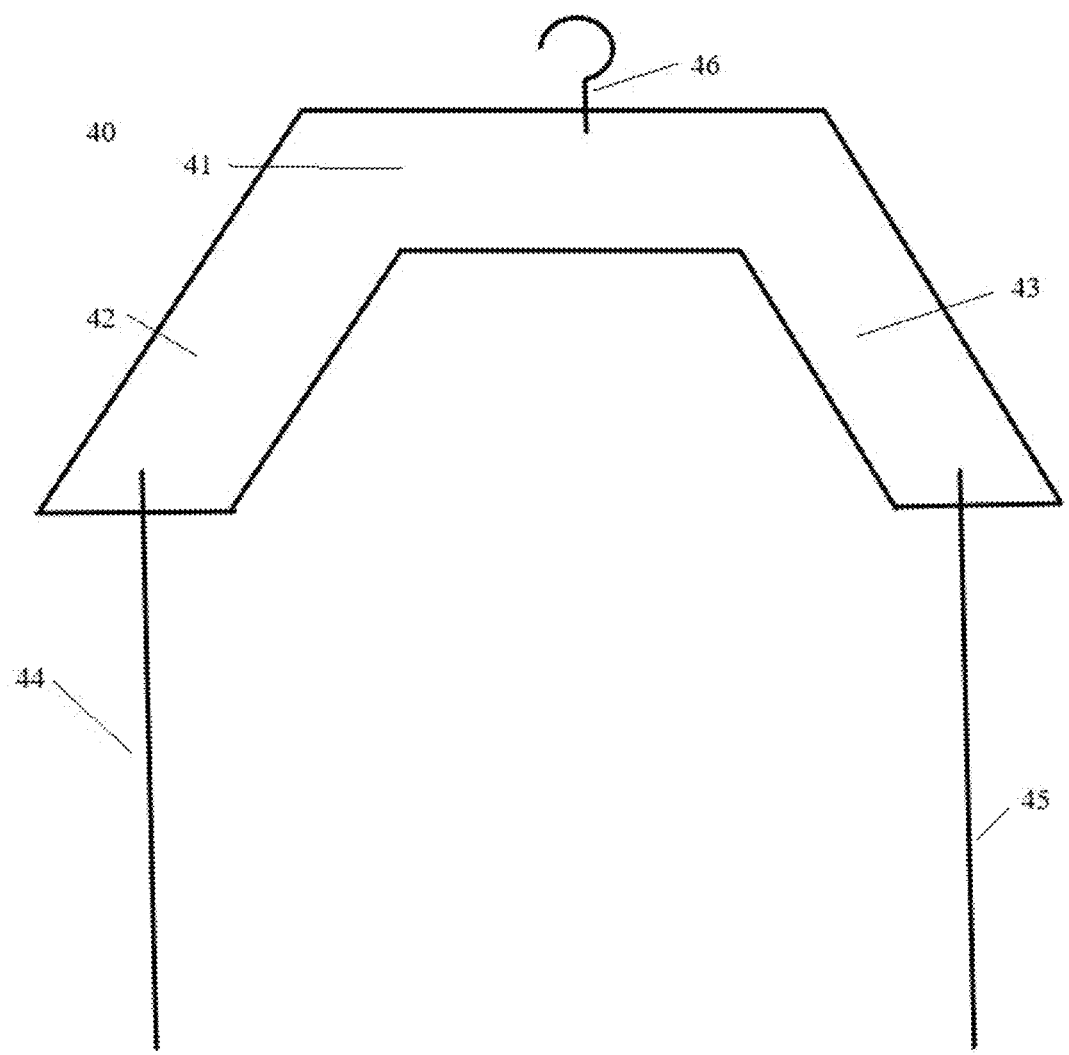
FIG. 4 illustrates a comb frame.

The number of comb frames 40 is not critical. Accordingly, 2, 3, 4, 5, 6, 7, 8, 9, 10, 15, 20 or more comb frames can be placed within the hive box. It is preferred that each comb frame rest snuggly against a second comb frame and one of an adjacent comb frame, the upper comb stop 30 or the lower comb stop 32. Referring to FIG. 4, each comb frame 40 will typically comprise a comb frame top 41, a first comb frame side 42, a second comb frame side 43, a first comb support 44 extending from the first comb frame side 42 and a second comb support 45 extending from the second comb frame side 43. A hook 46 can be attached to the top. The comb frame itself can define an arc or polygonal shape, such as a rectangle, trapezoid, hexagon, heptagon, octagon and the like. For example, the shape of the comb frame can be approximately the same as the cross-section shape of the hive cover (e.g., trapezoid to trapezoid, hexagon to hexagon, octagon to octagon). Using the same approximate shape or geometry can facilitate an even air flow in the head space between the top of the comb frames and the internal surface of the hive cover, when secured.

The comb frames rest upon two (a first and second) ladder frames 50. The ladder frames have the visual appearance of stair stringers, defining a rise and a tread or frame step 58. Typically, the ladder frames 50 can be attached (or secured) to the longitudinal side (roughly parallel with the A-A' axis) and inner surface of the hive box. Typically, the ladder frames 50 will be attached along the top edge of the hive box proximal to where the hive cover mates with the hive box. This configuration allows maximal volume for the honeycomb. When the beehive is installed at a desired beehive angle, relative to level ground, the frame steps can be roughly level (or parallel to level ground) and aligned. Each comb frame can then rest upon a frame step of each first and second ladder, such that the comb supports extend vertically down into the hive box and can support the honeycomb. The comb frames, with honeycomb supported thereon, can be easily removed and returned.

Each comb frame can further comprise a hook 46 disposed within and extending from the comb frame top. The word "hook" as used herein is intended to mean a hook, handle or other elongation that permits the beekeeper to remove one comb frame, independently of others. The hook can optionally be configured to allow the beekeeper to hang the comb frame (and its honeycomb) from the beehive for harvest, for example.

To maintain the comb frames adjacent to each other in the hive box, particularly as the beehive matures from its initial bee population and more comb frames are added, a comb frame tensioner 52 can be used. The comb frame tensioner can comprise a first tensioner end 61, a second tensioner end 62, and being adjustable in length. The tensioner can be a cloth strap or something more rigid, such as wood and metal.

Figure 5:
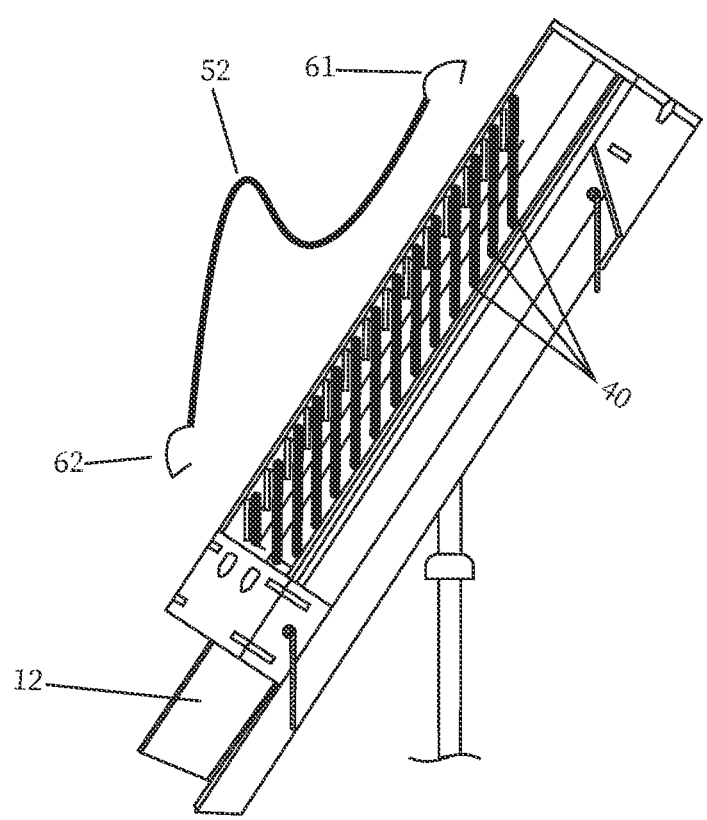
FIG. 5 illustrates a comb frame tensioner.

The ends, which can be simple hooks, can be placed at the top and bottom comb frames and the strap tightened, as shown in FIG. 5.

Figure 3:
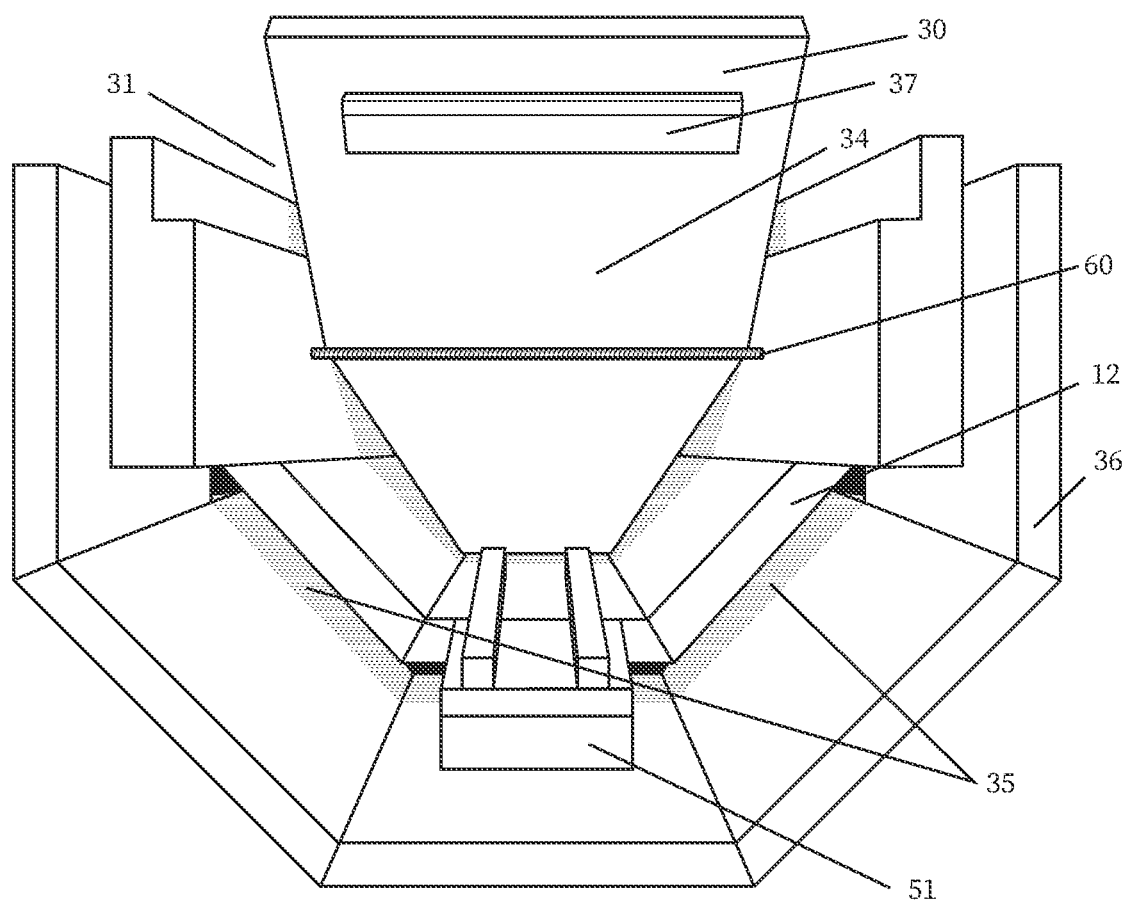
FIG. 3 is a top down view of the condensation chamber.

The hive box further has a condensation chamber 34. As shown in FIG. 3, which is a top down view of the condensation chamber through the hive box end (removed) with the hive cover removed. The condensation chamber can be defined upon assembly by the upper hive box end 13, the upper end of the hive box 12 (specifically, the portion of the hive box that does not contain one or more comb frames), the hive cover 20, and the upper comb stop 30 (specifically, the face of the upper comb stop external to the uppermost comb frame). The condensation chamber is further characterized by one or more drainage or condensation outlets 35. For example, a condensation outlet 35 can be located at to ensure condensate is directed out of the hive box and away from any honeycomb. This can be accomplished by building a shroud 36 built surrounding the hive box 12 where the spacing can be created with a support 51. Alternatively, a channel between the first hive box end face 14 and the upper comb stop 30 can be installed. Ventilation of humid air from the hive box can pass around the upper comb stop and enter the condensation chamber, this space can be called a ventilation gap or adjustable opening 31. The condensation chamber can also be equipped with a ventilation gap to allow air to escape. In can be advantageous to equip, or fill, the condensation chamber with an absorbent material (such as burlap or wood chips) to facilitate condensation and assist with moisture control. It can also be advantageous to insulate one or more surfaces of the condensation chamber. Thus, as the bees create warm, humid air within the beehive, the humid air is directed upwards along the headspace created by the hive cover and comb frames and enters the condensation chamber. The condensation chamber is then cooled by the ambient environment outside of the beehive. As the air cools, the water condenses and then exits through the drainage or condensation outlet. The use of a condensation chamber which is distinct from the volume housing the honeycomb carries a distinct advantage over typical beehives which rely solely upon ventilation to prevent condensation from simply dripping back into the honeycomb.

As described above, the beehive is configured to be installed at a beehive angle, relative to level ground. The angle is selected to ensure that the condensation chamber protects the honeycomb from any condensation. Typically, the beehive is configured such that the axis A-A' is maintained at an angle of between 45 and 85 degrees (preferably about 65 degrees) relative to level ground. In this way, the first hive box end is maintained at an elevation higher than the second hive box end and condensed water can drain to the exterior of the beehive.

Installation typically involves a support 54, such as a pole or post. Typically, an upright post attached to the exterior of the hive box with an angled mount 55 will be useful. The upright post can then be sunk into the ground at the height desirable for the beekeeper to access the internal volume of the beehive.

It can be apparent that the angled installation offers some additional geometrical choices to improve bee access and ventilation. In one embodiment, the first hive box end can be coupled to the hive box at an acute angle and/or the second hive box end is coupled to the hive box at an obtuse angle. In this geometry, the first and/or second hive box ends can be roughly perpendicular to level ground.

In one embodiment, the beehive comprises a hive box, a hive cover, an upper comb stop, a lower comb stop, a condensation chamber, a first and second ladder frame, a hive cover support frame, at least one comb frame, a comb frame tensioner 52, and a hive support. The hive box is trapezoidal in shape and comprises a first hive box end, a second hive box end, a first hive box end face, and a second hive box end face. The hive cover is trapezoidal in shape and comprises a first hive cover end, a second hive cover end, a first hive cover end face, a second hive cover end face, a hive cover hinge and a hinged support leg. The upper comb stop can optionally comprise at least one adjustable opening. The upper adjustable opening can be adjusted, for example, by installing one or more shims along an upper comb adjustable shelf, thereby providing a ventilation opening or gap along the upper inner surface of the beehive. The lower comb stop can also optionally comprise at least one adjustable opening. The lower adjustable opening can be adjusted, for example, by installing one or more shims along the lower comb adjustment shelf, thereby providing the bees access to the hive. The condensation chamber is defined upon assembly of the beehive, by the hive box, the hive box cover, and the upper comb stop. The first and second ladder frames are disposed within the hive box, each comprising a plurality of frame steps. The hive cover support frame can also be disposed within the hive box. The at least one comb frame comprises a first comb frame side, a second comb frame side, a comb frame top, a first comb support affixed to and extending from, the first comb frame side, and a second comb support affixed to and extending from, the second comb side. The comb frame tensioner 52 comprises a first end, a second end, and is adjustable in length. The hive support comprises an upright post and an angled mount. The hive support is affixed to the hive box such that the upright post is perpendicular with respect to level ground, and the angled mount maintains the beehive at an angle between perpendicular with, and parallel to, level ground. The at least one comb frame is disposed within the hive box with the first and third comb frame sides resting respectively on a frame step of the first and second ladder frames. The upper comb stop is placed between the at least one comb frame and the first hive box face. The lower comb stop is placed between the at least one comb frame and the second hive box face. The first end of the comb frame tensioner interfaces with the upper comb stop and the second end of the comb frame tensioner interfaces with the lower comb stop so as to maintain the stability and spacing of the at least one comb frame, the lower comb stop, and the upper frame stop.

The upper comb stop can serve as a moisture control regulator, honeycomb frame support, support bar positioner, lower part of the condensation chamber, and as a guide preventing the forming of comb structures in other than the desired locations, such as the comb framing. The lower comb stop serves as a ventilation regulator, bee entrance and lower honeycomb frame support. The first and second ladder frames support the comb frames and helps maintain proper spacing between them, allowing bee migration from the hive body to the comb frames. The comb frame tensioner gives proper honeycomb starting frame rigidity and spacing and serves to prevent cross and brace combing.

The condensing chamber is uniquely located above and behind the comb frames, unlike other beehive designs. This provides the bees with a dry location for the honeycomb and brood's nest. Vapor moisture given off by the bees rises above the outer comb frames and over the upper comb stop. The moisture vapor cools and condenses to droplets on the portion of the condensing chamber defined by the hive cover. The angle of the beehive facilitated by the hive support allows liquid moisture to collect and run down and away from the colony. This prevents condensed moisture from raining down on the colony and negatively impacting the health of the bees.

The design of the comb frames allows for a free hanging honeycomb which in turn allows for the natural communication of the colony through vibrations and sonic signals of the honeycomb structure. Because of this, the colony is better able to regulate generated heat for the brood. The comb frames are trapezoidal in shape. The comb frame supports extend downward from the first and second comb frame sides. The comb frame supports may comprise but are not limited to wood dowels. The comb frame design provides ample support and allows natural precise placement for the start of the honeycomb as compared to other designs.

The hive cover hinge mechanically interfaces the hive cover second end face and the hive box second end face, allowing the hive cover to swing out and away from the hive box and gives full access to the comb frames. The hive cover support unfolds from inside the hive box. The bars of the hive cover support are spaced such that the comb frames may rest upon them with the honeycombs suspended below. The hinged support leg of the hive cover lays flat on the five cover when closed and supports the hive cover when opened. The weight of the hive cover and any comb frames is distributed on the hive cover hinge and the hive cover support leg.

The hive cover sits on and seals with the hive body, preventing loss of the colony's control over brood temperature. The hive cover may be mechanically secured to the hive body independently of the hive cover hinge for security. The hive cover is slightly larger with respect to the hive body so as to form a drip edge beyond the dimensions of the hive body and prevent rain or moisture from entering into the beehive.

In another embodiment, the beehive may further comprise a chain attached to the hive cover and an attachment point on the at least one comb frame. The chain may be used for hanging the at least one comb frame when inspecting or removing comb frames from the beehive. The attachment point may include but is not limited to an S-type hook.

In another preferred embodiment, the beehive further comprises a moisture absorbent material in the condensation chamber.

In another embodiment, the hive box cover frame supports at least one comb frame when removed for inspection, harvesting, or replacement.

In another embodiment, the beehive further comprises a drain passage between the condensation chamber and the second hive box end face and the second hive box end face comprises a drain outlet.

In a particular embodiment of the invention, the invention provides a beehive comprising a hive box having a trapezoidal shape and comprising a first hive box end, a second hive box end, a first hive box end face, and a second hive box end face;

a hive cover, the hive cover being trapezoidal in shape and comprising a first hive cover end, a second hive cover end, a first hive cover end face, a second hive cover end face, a hive cover hinge and a hinged support leg;

an upper comb stop, the upper comb stop comprising at least one adjustable opening;

a lower comb stop, the lower comb stop comprising at least one adjustable opening;

a condensation chamber, the condensation chamber being defined upon assembly by the hive box, the hive box cover, and the upper comb stop;

a first ladder frame and a second ladder frame, said first and second ladder frames disposed within the hive box and comprising a plurality of frame steps;

a hive cover support frame, the hive cover support frame being disposed within the hive box.

at least one comb frame, the comb frame comprising a first comb frame side, a second comb frame side and a comb frame top, a first comb support affixed to and extending from, the first comb frame side, and a second comb support affixed to and extending from, the second comb side;

a comb frame tensioner, the comb frame tensioner comprising a first end, a second end, and being adjustable in length;

a hive support, the hive support comprising an upright post and an angled mount, and being affixed to the hive box such that the upright post is perpendicular with respect to level ground, and the angled mount maintains the beehive at an angle between perpendicular with, and parallel to, level ground;

wherein the at least one comb frame is disposed within the hive box with the first and third comb frame sides resting respectively on a frame step of the first and second ladder frames, the upper comb stop is placed between the at least one comb frame and the first hive box face, the lower comb stop is placed between the at least one comb frame and the second hive box face, the first end of the comb frame tensioner interfaces with the upper comb stop, the second end of the comb frame tensioner interfaces with the lower comb stop so as to maintain the stability of the at least one comb frame, the lower comb stop, and the upper frame stop.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A beehive comprising:
a. a hive box comprising a first hive box end, a first hive box end face, a second hive box end, a second hive box end face, an upper comb stop, a lower comb stop, and a hive cover, wherein the hive cover removably engages with the hive box and forms a volume with a polygonal shape in a cross-sectional plane;
b. a plurality of comb frames removably disposed within the hive box;
c. a condensation chamber, the condensation chamber being defined upon assembly by the hive box, the hive cover, and the upper comb stop and is remote with respect to the plurality of comb frames such that the condensation chamber does not contain the plurality of comb frames;
d. a condensation outlet disposed between the first hive box end face and the upper comb stop;
e. a bee entry.

2. The beehive of claim 1, further comprising an axis A-A' extending longitudinally through the hive box and through the first hive box end face and the second hive box end face, and further wherein the beehive is configured such that the axis A-A' is maintained at an angle of between 45 and 85 degrees relative to level ground.

3. The beehive of claim 1, wherein the first hive box end is maintained at an elevation higher than the second hive box end.

4. The beehive of claim 1, wherein the condensation chamber is configured to drain condensed water exterior to the beehive.

5. The beehive of claim 1, wherein the polygonal shape has 2, 3, 4, 5, 6, 7, or more obtuse angles.

6. The beehive of claim 1, wherein the lower comb stop further comprises an entry stop.

7. The beehive of claim 6 further wherein the bee entry is adjustable and is located between the entry stop and the hive box.

8. The beehive of claim 7, wherein the hive cover further comprises a roof plate defining a plane perpendicular to an axis A-A' extending longitudinally through the hive box and through the first hive box end face and the second hive box end face.

9. The beehive of claim 5 further comprising an insulation gap between the roof plate and the first hive box end.

10. The beehive of claim 5 comprising a first ladder frame and a second ladder frame disposed within the hive box and comprising a plurality of frame steps, wherein each of the plurality of frame steps is configured to support one of the plurality of comb frames.

11. The beehive of claim 10, wherein each comb frame comprises a first comb frame side, a second comb frame side, and a comb frame top, a first comb support affixed to and extending from the first comb frame side, and a second comb support affixed to and extending from the second comb side.

12. The beehive of claim 10 further wherein the plurality of frame steps are configured to be parallel with level ground, such that the plurality of frames rest vertically.

13. The beehive of claim 10, wherein each comb frame further comprises a hook disposed within and extending above the comb frame top.

14. The beehive of claim 13, wherein the hive box further comprises one or more hive cover supports configured to contact and support the hive cover when engaged with the hive box.

15. The beehive of claim 14, wherein the hive cover comprises a first hive cover end and a second hive cover end, wherein the second hive box end further comprises a hinge coupled with the second hive cover end.

16. The beehive of claim 15, wherein the hive cover further comprises a hinged support leg configured to support the hive cover when disengaged from the hive box.

17. The beehive of claim 16 further wherein the condensation chamber further comprises a ventilation gap.

18. The beehive of claim 17 further wherein the condensation chamber is configured to collect humid air from the beehive, cool the humid air under ambient conditions, drain water through the condensation outlet disposed in the condensation chamber and exhaust air through a ventilation gap.

19. The beehive of claim 18 further comprising a hive support, the hive support comprising an upright post and an angled mount, and being affixed to the hive box such that the upright post is perpendicular with respect to level ground, and the angled mount maintains the beehive at an angle between perpendicular with, and parallel to, level ground.

20. A beehive comprising a hive box having a trapezoidal shape and comprising a first hive box end, a second hive box end, a first hive box end face, and a second hive box end face;
  a hive cover, the hive cover being trapezoidal in shape and comprising a first hive cover end, a second hive cover end, a first hive cover end face, a second hive cover end face, a hive cover hinge and a hinged support leg;
  an upper comb stop, the upper comb stop, together with the hive cover, defining at least one adjustable opening;
  a lower comb stop, the lower comb stop, together with the hive box, defining at least one adjustable opening;
  a condensation chamber, the condensation chamber being defined upon assembly by the hive box, the hive box cover, and the upper comb stop;
  a first ladder frame and a second ladder frame, said first and second ladder frames disposed within the hive box and comprising a plurality of frame steps;
  a hive cover support frame;
  at least one comb frame, the at least one comb frame comprising a first comb frame side, a second comb frame side, and a comb frame top, a first comb support affixed to and extending from the first comb frame side, and a second comb support affixed to and extending from the second comb side;
  a comb frame tensioner, the comb frame tensioner comprising a first end and a second end and being adjustable in length;
  a hive support, the hive support comprising an upright post and an angled mount, and being affixed to the hive box such that the upright post is perpendicular with respect to level ground, and the angled mount maintains the beehive at an angle between perpendicular with, and parallel to, level ground;
wherein the at least one comb frame is disposed within the hive box with the first and second comb frame sides resting respectively on at least one frame step of the first ladder frame and at least one frame step of second ladder frame, the upper comb stop is placed between the at least one comb frame and the first hive box end face, the lower comb stop is placed between the at least one comb frame and the second hive box end face, the first end of the comb frame tensioner interfaces with the upper comb stop, and the second end of the comb frame tensioner interfaces with the lower comb stop so as to maintain the stability of the at least one comb frame, the lower comb stop, and the upper frame stop.

* * * * *